United States Patent
Kim-Habermehl et al.

(10) Patent No.: US 8,366,822 B2
(45) Date of Patent: Feb. 5, 2013

(54) CEMENTITIOUS TILE ADHESIVES AND METHOD OF APPLYING THE SAME TO A TILE SUBSTRATE

(75) Inventors: Linda H. Kim-Habermehl, Midland, MI (US); Liang Hong, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 11 days.

(21) Appl. No.: 13/164,080

(22) Filed: Jun. 20, 2011

(65) Prior Publication Data

US 2012/0318434 A1 Dec. 20, 2012

(51) Int. Cl.
*C04B 24/00* (2006.01)

(52) U.S. Cl. ............ 106/696; 106/724; 106/728; 524/2; 524/5; 427/415; 427/427

(58) Field of Classification Search .................. 106/696, 106/724, 728; 524/2, 5; 427/415, 427
See application file for complete search history.

(56) References Cited

U.S. PATENT DOCUMENTS

| | | |
|---|---|---|
| 3,409,578 A | 11/1968 | Hwa |
| 3,822,230 A | 7/1974 | Nelson |
| 5,576,378 A | 11/1996 | Kuhlmann et al. |
| 5,872,189 A | 2/1999 | Bett et al. |
| 5,922,796 A | 7/1999 | Colombet et al. |
| 6,451,900 B1 | 9/2002 | Kuehn et al. |
| 6,730,722 B1 | 5/2004 | Eck et al. |
| 6,962,950 B1 | 11/2005 | Bastioli et al. |
| 2003/0069337 A1 | 4/2003 | Gugumus |
| 2003/0197151 A1 | 10/2003 | Gugumus |
| 2004/0204518 A1 | 10/2004 | Harzschel et al. |
| 2004/0241111 A1 | 12/2004 | Lazzari et al. |
| 2007/0112117 A1 | 5/2007 | Weitzel |
| 2008/0132624 A1 | 6/2008 | Killat et al. |
| 2009/0192242 A1 | 7/2009 | Willimann et al. |

FOREIGN PATENT DOCUMENTS

| | | |
|---|---|---|
| GB | 1419833 | 12/1975 |
| WO | 9948997 A1 | 9/1999 |
| WO | 0104212 A1 | 1/2001 |
| WO | 2009099717 A2 | 8/2009 |

*Primary Examiner* — Paul Marcantoni
(74) *Attorney, Agent, or Firm* — Andrew E. C. Merriam

(57) ABSTRACT

Cement tile adhesives and methods for using them, the adhesives comprising a dry mix of a water-redispersible polymer powder made from a low carboxylation, large particle size water-soluble film-forming vinyl aromatic-diene copolymer latex and a reduced amount of cellulose ether exhibit superior water immersion shear strength and freeze/thaw shear strength.

10 Claims, No Drawings

CEMENTITIOUS TILE ADHESIVES AND METHOD OF APPLYING THE SAME TO A TILE SUBSTRATE

The present invention relates to cement tile adhesives (CTAs) comprising inorganic hydraulic cement, cellulose ethers and water-redispersible polymer powders (RDPs) from vinyl aromatic-diene copolymers having carboxyl groups. In particular, the present invention relates to compositions useful in mortar formulations comprising cement, sand, a low carboxylation, large particle size styrene butadiene redispersible powder and a low dosage of cellulose ether for cementitious tile adhesive or cement containing tile adhesive (CTA) applications, as well as to methods of using the same comprising applying the same to a tile substrate.

CTAs are typically prepared with cement, sand, organic polymers, and cellulose ethers. CTA producers struggle to provide adhesives that meet the water immersion shear strength and freeze/thaw shear strength required by applicators who mix the CTAs and use them on site. In the past, the applicators have added cellulose ether to the CTA mixture to control rheology, water retention, slip resistance and improved workability of the CTA or mortar in use. However, cellulose ethers are expensive, and reducing the amounts of them is desirable.

More recently, others have included polymers, such as superplasticizers and polymer powders in CTA applications to improve workability and the strength of the cured adhesives made therefrom. However, such polymers can greatly increase the costs in use to the applicator.

U.S. Pat. No. 3,822,230 to Nelson discloses a latex composition having an average particle diameter from about 500 nm to about 1,000 nm, preferably from about 150 nm to about 400 nm which can be spray dried to a form a powdery product which is dispersible in water to form a reconstituted latex having approximately the same particle size as the original latex. However, additional formulation compounds having two vicinal carboxyl groups, such as the disodium salt of 1,2,3,6-tetrahydrophthalic acid, are required to provide water redispersibility; these add to the amount of carboxylation.

The present invention solves the problem of providing a cement containing tile adhesive that exhibits improved water immersion shear strength performance and freeze/thaw shear strength performance with a reduced amount of cellulose ether thereby also reducing formulation cost.

SUMMARY OF THE INVENTION

In accordance with the present invention, a dry mix cement composition, such as a cement containing tile adhesive (CTA), comprises dry mortar or cement, a water-redispersible polymer powder (RDP) made from a low carboxylation, large particle size vinyl aromatic-diene latex copolymer, for example, a styrene butadiene copolymer, having a degree of carboxylation of from 0.1 to 2.25 wt. %, defined as the amount of copolymerized carboxyl group containing monomer based on the total weight of monomers used to make the polymer, preferably, 0.5 wt. % or more, or preferably, 2.125 wt. % or less, or, more preferably, 2 wt. % or less, and having a weight average particle size of 200 nm to 500 nm, or preferably, 220 nm or more, or, more preferably, 240 nm or more, or, up to 400 nm, and a cellulose ether in an amount of from 0.17 to 0.35 wt. %, based on the total weight of the dry mix composition of the present invention.

According to the present invention, when the dry mix is mixed with water to form a mortar or adhesive having a mortar viscosity within the range of 400,000 to 600,000 cps mortar at 5 rpm, the compositions enable one to reduce by 15% or more, or preferably, 20% or more, or, more preferably 30% or more, the amount of cellulose ether that would be needed to achieve the same mortar viscosity as compared to the same cement comprising the same cellulose ether, and the same amount of the same RDP made from the same polymer as the vinyl aromatic-diene latex polymer of the present invention having the same average particle size, with the exception that the latex polymer in the comparative composition has a degree of carboxylation of 2.5 wt. %. The compositions of the present invention enable the user to achieve improved water immersion shear strength and improved freeze-thaw shear strength.

Suitable amounts of cellulose ether may range from 0.16 to 0.35 wt. %, based on the total weight of the dry mix composition of the present invention. As amounts of cellulose ether used are inversely proportional to their viscosity in water, a suitable amount of a cellulose ether having a viscosity of 70,000 cps (Haake, 2.55 reciprocal seconds as determined using a Haake Rotoviskometer at room temperature) in a 2 wt % solution in water may range from 0.17 to 0.32 wt. %, based on the total weight of the dry mix composition, or, preferably, up to 0.27 wt. %, or, more preferably, up to 0.25 wt. %, or, even more preferably, up to 0.22 wt. %; and for a cellulose ether having a viscosity of 40,000 cps (Haake, 2.55 reciprocal seconds) in a 2 wt % solution in water at room temperature of from 0.18 to 0.35 wt. % based on the dry weight of the dry tile adhesive composition, or, preferably, up to 0.30 wt. %, or, more preferably, up to 0.28 wt. %, or, even more preferably, up to 0.25 wt. %.

In another aspect, the invention provides methods comprising providing a cement containing tile adhesive composition having the re-dispersible polymer powder of the present invention, mixing the composition with water to make a mortar having a desired mortar viscosity, applying the mortar to a substrate, applying a tile thereto, and drying. In the methods of the present invention, the amount of cellulose ether that enables one to achieve a given desired mortar viscosity, is reduced by 15% or more, or preferably, 20% or more, versus the amount of cellulose ether that would be needed to achieve the same mortar viscosity, such as, for example, 400,000-600,000 cps mortar at 5 rpm, as the same cement comprising the same cellulose ether, and the same amount of the same RDP made from the same polymer as the vinyl aromatic-diene latex polymer of the present invention having the same average particle size, with the exception that the latex polymer in the comparative composition has a degree of carboxylation of 2.5 wt. %.

A desirable mortar viscosity may range, for example from 400,000-600,000 cps mortar at 5 rpm.

Examples of desirable substrates include, for example, plywood; backerboard, such as, for example, wallboard, greenboard, gypsum wallboard and fiber cement board; concrete; oriented strandboard; interior wall surfaces, including unfinished surfaces, such as plaster surfaced walls, or finished surfaces, such as painted or wallpapered surfaces; an insulation panel, or a soundproofing panel.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(methyl)styrene" includes, in the alternative, styrene and methyl styrene.

As used herein, unless otherwise indicated, the phrase "molecular weight" refers to the weight average molecular weight as measured by gel permeation chromatography (GPC) against a poly(styrene) standard. As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, the term "mortar viscosity" refers to the 5 rpm Brookfield viscosity of a mortar measured at 25° C., as in the examples below.

As used herein, $T_g$ is measured using differential scanning calorimetry or DSC (rate of heating 10° C. per minute, $T_g$ taken at the midpoint of the inflection.)

As used herein, the phrase "wt. %" stands for weight percent.

As used herein, unless otherwise indicated, the phrase "average particle size", refers to the particle diameter or the largest dimension of a particle in a distribution of powder particles as determined by laser light scattering such that 50 wt. % of the particles in the distribution are smaller than the particle and 50 wt. % of the particles in the distribution are larger than the particle. For initial latex dispersion particles, the average particle size was measured via dynamic light scattering using a Nanotrac NPA 150 (Microtrac Inc., York, Pa.) per manufacturer's recommendations. A volume average particle size was recorded. For redispersed particles, the particle size distribution was measured using a Coulter LS 230 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

As used herein the term "setting" refers to the solidification of the plastic cement paste. See *Concrete—Microstructure, Properties, & Materials,* 3rd edition, P. Kumar Mehta et al., page 220. The beginning of solidification, called the initial set, marks the point in time when the paste has become unworkable. The paste does not solidify suddenly, but requires considerable time to become fully rigid. The time taken to solidify completely marks the final set.

The present inventors have found that the combination of a RDP made of a low carboxylation, large particle size water-insoluble film-forming polymer having at least one ethylenically unsaturated dicarboxylic acid monomer, and a reduced amount of a cellulose ether results in the cement composition having unexpectedly superior water immersion shear strength and freeze/thaw shear strength. For example, characterization according to test standard ANSI 118.4 section 5.2.3 (2011) shows that the CTAs formulated with RDPs made of a specific large particle size and low carboxylation polymer and a reduced amount of cellulose ethers exhibit unexpected superior 7 day water immersion impervious ceramic mosaic shear strength relative to mortars formulated with other styrene butadiene and vinylacetate ethylene (VAE) redispersible polymer powders. In addition, characterization according to test standard ANSI 118.4 section 5.2.6 (2011) shows that the CTAs in the invention exhibit excellent 28 day impervious ceramic mosaic tile freeze/thaw shear strength. Accordingly, the combination of the large particle size, low carboxylation level specified of water-insoluble film-forming polymer and the reduced dosage of the cellulose ether enables excellent water immersion shear strength and freeze/thaw shear strength of the cement adhesive.

The polymers which may be employed in the present invention are water-insoluble film-forming polymers having a low degree of carboxylation and a large average particle size. Preferred water-insoluble film-forming polymers are styrene-butadiene copolymers. In embodiments of the invention, the water-insoluble film-forming polymer may be a large particle size, low carboxylation copolymer comprising the monomers styrene, butadiene, itaconic acid and acrylonitrile.

The water-insoluble film-forming copolymers can be prepared by aqueous emulsion or suspension polymerization, preferably emulsion polymerization, in conventional manner, employing conventional polymerization temperatures, e.g. from 40° C. to 120° C., preferably, 70° C. or more, or, preferably, up to 105° C., and pressures, e.g. with diene comonomer pressures being 150 psi or below, preferably, 100 psi or below. The polymerization may be initiated using conventional amounts of one or more conventional water-soluble or oil (monomer) soluble initiator, such as t-butyl peroxide and cumene hydroperoxide, or a redox initiator combination, using a reducing agent such as sulfites and bisulfites. To control the molecular weight, conventional regulator substances or chain transfer agents, such as mercaptans, alkanols, and dimeric α-methylstyrene can be used during the polymerization in conventional manner in conventional amounts of from 0.01 to 5.0% by weight, or, preferably, up to 3% by weight, based on the monomers to be polymerized. The polymerization process preferably takes place in the presence of conventional amounts of one or more conventional emulsifier and/or protective colloid, such as, for example, water soluble copolymers having a number average molecular weight of 2000 or more. Suitable emulsifiers include anionic, cationic and nonionic emulsifiers, for example anionic surfactants such as, for example, 8 to 18 carbon alkyl or alkyl aryl ether sulfates, and their salts, and nonionic surfactants, such as, for example, alkyl or alkyl aryl polyglycol ethers. Suitable protective colloids, instead of or in addition to one or more surfactants, may include, for example, polyvinyl alcohols; polysaccharides in water-soluble form, e.g. starches and cellulosics; proteins such as, for example, casein or soy protein; lignin sulfonates; and synthetic copolymers such as, for example, poly(meth)acrylic acid, and copolymers of (meth) acrylates with carboxyl-functional comonomer units.

One or more basic compound may be added before, during or after polymerization in an amount of 0.4 moles or more, preferably from 0.5 to 2 moles, more preferably 0.6 moles or more per mole of carboxylic groups in the copolymer. The basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as sodium hydroxide or potassium hydroxide.

The copolymers may comprise the copolymerization product of from 20 to 79.9%, preferably, 30% or more, for example from 60% to 70% by weight, of one or more vinyl aromatic comonomer a), from to 79.9%, preferably 60% or less, for example from 20% to 33% by weight of one or more 1,3 diene comonomer b), from 0.1 to lower than 2.25%, preferably, 0.5% or more, or, preferably, 2.125% or less, or, more preferably from 0.75% to % by weight of comonomer c), and from 0 to 76%, preferably 40% or less or, more preferably 20% or less, for example from 3% to 7% by weight, of comonomer d), based on the total weight of monomers used to make the copolymer.

The comonomers and their weight proportions are chosen so as to make a copolymer having a glass transition temperature (Tg) of from −20° C. and above, preferably 0° C. or more, or, more preferably, 10° C. and above, or up to or less than 30° C., preferably up to or less than 28° C., or, more preferably up to or less than 25° C. If the Tg is too high for use in cement compositions, end use properties suffer, such as flexibility, especially in cold temperatures, and crack bridging. The Tg of the copolymers can be determined in a known manner by differential scanning calorimetry (DSC). In uses as a sacrificial binder in ceramic processing, the useful Tg of the SB RDP can be as high as 110° C., preferably 60° C.

Suitable comonomers a) include, for example, styrene, alpha-methylstyrene, $C_1$-$C_4$ alkyl-styrenes, such as o-vinyltoluene and tert-butylstyrene and $C_1$ to $C_8$ alkyl and cycloalkyl (meth)acrylates. Styrene is preferred. In styrene butadiene copolymers, suitable comonomers b) include, for example, 1,3-butadiene and isoprene, with 1,3-butadiene being preferred. Suitable comonomers c) include, for example, ethylenically unsaturated di-carboxylic acids, their anhydrides, and their salts, particularly itaconic acid and/or maleic acid and/or fumaric acid to improve the dispersibility of the redispersible copolymer powder.

Suitable optional comonomers d) include, for example, alkyl esters of (meth)acrylic acid, such as, for example, ethyl acrylate, methyl methacrylate, n-butyl acrylate, or 2-ethylhexyl (meth)acrylate, ethylenically unsaturated amides and nitriles, such as, for example, (meth)acrylonitrile; diesters of fumaric acid or maleic acid; hydroxy alkyl (meth)acrylates; sulfur acid monomers, such as sodium styrene sulfonate; phosphorus acid monomers, such as phosphoalkyl (meth) acrylates and crosslinking comonomers, such as, for example, divinyl benzene or divinyl adipates; postcrosslinking comonomers, such as acrylamidoglycolic acid (AGA), methyl methylacrylamidoglycolate (MAGME), N-methylol-(meth)acrylamide (NMA) and its alkyl esters; allyl methacrylates or allyl N-methylol carbamates; epoxy-functional comonomers, such as glycidyl (meth)acrylates; and silicon-functional comonomers, such as alkoxysilane containing (meth)acrylates or vinyl monomers.

Preferably, to increase the water redispersibility of the powder obtained upon drying, a basic compound, as described above, can be added prior to substantially drying the aqueous copolymer dispersion.

Preferably, to provide good water redispersibility and odor control, 75% or more, preferably, 85% or more, or, more preferably, 95% or more of the total number of carboxyl groups in the copolymer may be located at the surface of the copolymer powder particles. In such copolymers, some or all of the surface carboxyl groups may be present in their salt form in the copolymer powder. The sum of the molar amount of carboxylic groups located at the surface of the copolymer particles and the molar amount of carboxylic groups in the liquid phase of the aqueous dispersion are separately measurable by known titration methods. The measured molar amount of carboxylic groups located at the surface of the copolymer particles and in the liquid phase of the aqueous dispersion is then divided by the total amount of carboxylic groups in the aqueous dispersion of the copolymer particles, taken as the amount of comonomer(s) c) used to make the copolymer based on the total weight of monomers used to make to copolymer, to calculate the percentage of carboxylic groups that are located at the surface of the copolymer powder. Such copolymers may be made, for example, by the sole use of ethylenically unsaturated dicarboxylic acid(s) as comonomer c), by staged monomer feeding in copolymerization to include more acid in the latter part of copolymerization, and/or by conducting the polymerization at a pH of from 3 to 9, preferably, from 4 to 8, or, preferably 6 to 8.

Preferably, to achieve good water immersion shear strength and freeze/thaw shear strength, the amount of carboxylation is from 0.1% by weight to lower than 2.25% by weight, preferably from 0.5% by weight to 2.125% by weight, or, more preferably from 0.75% by weight to 2% by weight, of at least one ethylenically unsaturated dicarboxylic acid, salts thereof, or mixtures thereof, preferably itaconic acid and/or maleic acid and/or fumaric acid, based upon the total comonomer weight or the weight of the water-insoluble film forming polymer, such as a styrene butadiene copolymer with itaconic acid. In accordance with the present invention, the combination of the polymer particle size and total carboxylation level specified together with the reduced amount of cellulose ethers significantly impacts water immersion shear strength and freeze/thaw shear strength.

In accordance with the present invention, the particle size of the water-insoluble film-forming polymer is also important to achieve given shear strength. The water-insoluble film-forming polymer in the aqueous dispersion or latex which is to be spray dried has an average particle size of from 200 nm to 500 nm, preferably, 220 nm or more, or, preferably, up to 400 nm, or, more preferably, 240 nm or more. The aqueous dispersions or latex, which refers generically to a stable dispersion or emulsion of polymer microparticles in an aqueous medium, obtained in the present invention may generally have a solids content of from 30 to 75% by weight, for example between 35% and 65% by weight, preferably from 40 to 60% by weight.

The water redispersible polymer powders of the present invention include a co-dried admixture of a water-insoluble film-forming polymer and a colloidal stabilizer for colloidal stabilization and redispersibility of polymer powders into submicron particle sizes. The use of a low carboxylation, large average particle size water-insoluble film-forming polymer provides a low viscosity for spray drying even at relatively high levels of colloidal stabilizer and high levels of solids in the dispersion subjected to spray drying. Examples of suitable colloidal stabilizers include, for example, polyvinyl alcohols. Preferred polyvinyl alcohols for use herein are partially hydrolyzed polyvinyl alcohols. In embodiments of the invention, the amount of PVOH or other known colloidal stabilizers employed to achieve colloidal stability may be at least 1% by weight, for example from 2% by weight to 30% by weight, preferably from 5% by weight to 20% by weight, based upon the weight of the water-insoluble polymer.

The water-redispersible polymer powder may be produced by drying an aqueous mixture of the water-insoluble film-forming polymer and a colloidal stabilizer to obtain the water-redispersible polymer powder. Preferably, an aqueous dispersion of the water-insoluble film-forming polymer is admixed with the colloidal stabilizer to obtain a substantially homogeneous aqueous dispersion which is then spray dried to obtain the water redispersible polymer powder. In one example, the viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 60% by weight, preferably from 35% to 50% by weight, based on the total weight of the dispersion. To prepare the water-redispersible polymer powders, the aqueous dispersions are dried, preferably by spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 45° C. to 120° C., preferably from 60° C. to 90° C., depending on the plant, the Tg of the resin and the desired degree of drying.

In addition to the colloidal stabilizer, conventional optional additives in conventional amounts can be added prior to drying the aqueous dispersion, such as an antifoaming agent in an amount of up to 1.5% by weight of antifoamant, based on the weight of the redispersible polymer powder particles. Other additives which may be employed, in conventional amounts, include one or more salts, such as $CaCl_2$, and $MgCl_2$, emulsifiers or surfactants, monosaccharides, disaccharides, and anticaking agents (antiblocking agents) such as kaolin. The amount of the anticaking agent may be up to 30% by weight, preferably from 3% by weight to 15% by weight, based on the total powder quantity.

The X50 size of the particle size distribution of the redispersible polymer powder depends on drying conditions and drying equipment. X50 represents the median diameter in micrometers, which means that 50% by weight of the particles are smaller than this diameter. The redispersible polymer powder of the present invention preferably has an X50 particle size diameter of from 5 to 300 micrometers, preferably from 20 to 200 micrometers, most preferably from 50 to 100 micrometers. The particle size distribution of the powder can be measured by laser diffraction using a particle size analyzer "Sympatec Helos" at a measuring range of 1.8-350 μm and dispersing the powder by compressed air.

The weight of the polymer particles in the redispersible polymer powder, for example, weight of the carboxylated copolymer of vinyl aromatic comonomer and 1,3-diene comonomer described herein in the powder, may preferably be from 40% by weight to 95% by weight, more preferably from 65% by weight to 87% by weight, of the total weight of the water-redispersible polymer powder.

As used herein, the term "redispersible polymer powder" means a powder which may be readily dispersed into deionized water to provide a particle size distribution of the original particle size of the latex or emulsion polymer used to make the redispersible polymer powder.

Suitable cellulose ethers for use in the present invention may include ionic cellulose ethers such as sulphoethylcellulose or carboxymethylcellulose and salts thereof, e.g. sodium-carboxymethylcellulose, sodium-sulphoethylcellulose, or the respective salts with other cations e.g. potassium or ammonium and the like, or non-ionic cellulose ethers, such as alkylcelluloses, hydroxyalkyl alkylcelluloses or hydroxyalkylcellulose, for example, methylcellulose, methyl hydroxyethylcellulose, methyl hydroxypropylcellulose, hydroxyethylcellulose, ethylhydroxyethylcellulose, methyl ethylhydroxyethylcellulose, methyl hydroxyethylhydroxypropylcellulose, methyl hydroxyethylhydroxybutylcellulose or mixtures of the abovementioned products. A cellulose ether composition may comprise, in addition to cellulose ethers, other additives, for example liquefiers/flow agents (for example sulphonates based on melamine or naphthalene and also polyethers), hydrophobizing agents and lubricants (for example poly(ethylene oxide) or related polymers).

Conventional dosages for cellulose ethers in the CTA usually vary with factors including, for example, the quality of the formulation, final end-use performance requirements and molecular weight of the cellulose ethers. Generally, the amount of cellulose ethers needed to achieve a given viscosity is proportional to 1/molecular weight of the cellulose ether. Suitable amounts of cellulose ether depends on the molecular weight of the cellulose ether and may range, for example, from a total amount of 0.05 wt. % to 0.4 wt. %, preferably 0.1 wt. % to 0.3 wt. %, based on the dry weight of the tile adhesive, or, more preferably, up to 0.25 wt. %, or even more preferably, up to 0.22 wt. %. Such amounts may be reduced by 15% or more, preferably 20% or more, or more preferably 30% or more, as compared to the amount of cellulose ether that would be needed to achieve such shear strength with the same cement composition having an RDP latex made from the same polymer and without the degree of carboxylation and the particle size of the present invention.

At a higher molecular weight, the cellulose ether dosage decreases. Different molecular weight of cellulose ethers may be used in the invention and the viscosities of the cellulose ethers corresponds to their molecular weight. Viscosity of the cellulose ether is determined by measuring 2 wt. % solution in water, using a Haake Rotoviskometer at 20° C., shear rate 2.55 $s^{-1}$. Examples of the dosage of the cellulose ether for some viscosity ranges of 60,000 to 70,000 mPa·s, the cellulose dosage reduction may be from 10% to 30%, preferably 20% to 30%; for a viscosity from 40,000 mP·s to 50,000 mPa·s, the cellulose dosage reduction may be preferably from 10% to 30%, more preferably 20% to 30%.

In accordance with the present invention, examples of cement include for example, portland cement, pozzolanic cement, slag cement, magnesia cement and phosphate cement.

In accordance with the present invention, the CTAs may also include fillers. Examples of fillers include, for example, sand such as silica sand and quartz sand, quartz flour, calcium carbonate, dolomite, aluminum silicates, talc or mica, or light weight fillers such as pumice, foamed glass, aerated concrete, perlites or vermiculites. Mixtures of the fillers may also be included.

The cement composition may include other conventional additives in conventional amounts, such as, for example, alkali metal hydroxide and/or alkaline earth metal hydroxide selected from the group consisting of zinc oxide, zinc hydroxide, and zinc hydroxide carbonate.

In another aspect of the present invention, methods of sealing, bonding or coating a substrate comprise (1) providing a cement containing tile adhesive composition having the re-dispersible polymer powder of the present invention, (2) mixing it with water, and (3) applying to the substrate and drying. The composition is preferably used in products for construction industry and can be used in or to make skim coats, crack isolation membranes, sealing slurries or repair mortars. Examples of suitable substrates include, for example, a tile, plywood, backerboard, an insulation panel, interior wall surfaces, steel reinforcement, aged concrete, hardened concrete, aged mortar, hardened mortar, or a soundproofing panel. The consistency of a cement composition is adjusted by the water added to the dry mix powder. The water may be added in such an amount to achieve a desired consistency according to end-use requirements. The inventors have surprisingly found that applying the cement composition in the invention to a substrate results in improved water immersion shear strength and freeze thaw shear strength.

The following examples are provided for illustrative purposes only and are not intended to limit the scope of the claims that follow. Unless otherwise indicated, all parts and percentages are by weight, all temperatures are at room temperature, and all pressures are at standard pressure.

EXAMPLES

Test Methods

Dry Mix Preparation: The cement, sand, polymer, and thickener are weighed and placed into a plastic bag which is then hand mixed for 2 minutes and conditioned for 24 hrs.

Density: Mortars are placed into a container of known volume, tamped down, and then weighed.

Mortar Viscosity: Viscosities are measured with a Brookfield Synchro-lectric viscometer (Model RVT) in combination with a Brookfield Helipath stand at 25° C. The mortar is filled into a density cup and the spindle (T-F) is positioned such that it just touches the surface of the mortar. The spindle of the viscometer rotates for 2 minutes with 5 rpm. During the rotation the viscometer is moved up and down so that its rotating spindle describes a helical path through the sample. The first measurement is not taken until the spindle is fully submerged after one full rotation. Four readings are measured as the viscometer moves in each direction, the average of which is reported.

Redispersibility: Redispersibility of the powder is measured by dispersing polymer powder into deionized (DI) water at a 1% by weight solids level, and vortexed for 30 seconds twice. The redispersion was then measured using a Coulter LS 230 Laser Diffraction Particle Size Analyzer. The redispersiblity is characterized by the volume percentage of polymer particles below 1 μm in the redispersion. Full redispersion is defined as redispersibility greater than 75%. The results are listed in Table 1, below.

Shear Strength: Plywood shear strength was measured according to ANSI 118.4, sections 4.1.1 and 4.1.2. Samples are assembled with a mortar layer bonding one piece of plywood and one piece of quarry tile together. Shear strength is measured after samples are aged for 7 days and 28 days. Impervious ceramic mosaic shear strength was measured according to ANSI 118.4, sections 5.2.2, 5.2.3, and 5.2.4. Samples are assembled with a mortar layer bonding two pieces of impervious ceramic mosaic tile together. Shear strength is also measured after samples are aged (in constant temperature (21° C.-25° C.) and humidity (45-55% relative humidity) conditions) for 7 days (ANSI 118.4, section 5.2.2), 7 days followed by immersion in water for an additional 7 days (ANSI 118.4, section 5.2.3), 28 days (ANSI 118.4, section 5.2.4), and 28 days followed by immersion in water for 6 to 8 hrs followed by 20 cycles of freezing (for a minimum of 12 hrs) and water immersion for 28 day freeze thaw (ANSI 118.4, 5.2.6). These ANSI test standards used for shear strength testing are summarized below:

| Shear Strength Test | ANSI Test Standard |
|---|---|
| Impervious Ceramic Mosaic Tile, 7 day | 118.4, 5.2.2 |
| Impervious Ceramic Mosaic Tile, 7 day water immersion | 118.4, 5.2.3 |
| Impervious Ceramic Mosaic Tile, 28 day | 118.4, 5.2.4 |
| Impervious Ceramic Mosaic Tile, 28 day freeze/thaw | 118.4, 5.2.6 |
| Plywood, 7 day | 118.11, 4.1.1 |
| Plywood, 28 day | 118.11, 4.1.2 |

Compressive Strength: Compressive strength was measured according to ANSI A118.4, section 6.1. Samples are prepared by placing the mortars into 2" cube molds which are covered with a polyethylene film for 24 hours. This film is removed and after an additional 72 hrs, the cubes are removed from the molds and then stored for an additional 25 days before testing.

Preparation Example A

A redispersible polymer powder was made by admixing: a water-insoluble film forming carboxylated styrene butadiene (SB) latex which has a copolymerized comonomer content of 63.5 (weight) parts styrene, 28.75 parts butadiene, 6 parts acrylonitrile, and 1.75 parts itaconic acid (a carboxylation of 1.75% by weight of itaconic acid, based upon the total comonomer weight), with a particle size of 249 nm, and a $T_g$ of less than 25° C., and 10% by weight of MOWIOL™ 4-88, based upon the weight of the latex polymer. The MOWIOL™ 4-88 is a partially hydrolyzed PVOH (polyvinylalcohol) in granular form (Kuraray America, Houston, Tex.) and has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$). The mixture had a total solids content of 35% by weight.

This mixture was pumped to a two-fluid nozzle atomizer equipped on a Mobile Minor (GEA Process Engineering Inc, Columbia, Md.) spray dryer. The air pressure to the nozzle was fixed at 1 bar with 50% flow which is equivalent to 6 kg/hr of airflow. The spray drying was conducted in an $N_2$ environment with an inlet temperature fixed at 140° C., and the outlet temperature was targeted to 50° C.±1° C. by tuning the feed rate of the mixture. Concurrently, kaolin powder (Kamin™ HG90 Kamin LLC, Macon, Ga.) was added into the chamber for spray drying as an anti-caking agent, at an amount of 10% by weight, based on the total weight of the product dry powder.

The redispersible polymer powder obtained by the spray drying had a (volume) average particle size of from 10 to 20 μm. The spray dried powder was dispersed into deionized (DI) water at a 1% by weight solids level, and vortexed for 30 seconds twice. The redispersion was then measured using a Coulter LS 230 Laser Diffraction Particle Size Analyzer. Redispersibility data is shown in Table 1, below, which indicates that the redispersible polymer powder was readily dispersed to the original SB latex particle size distribution.

Preparation Example B

A redispersible polymer powder was produced as in Example A except that the water-insoluble film forming carboxylated styrene butadiene (SB) latex had a copolymerized comonomer content of 62.5 (weight) parts styrene, 29 parts butadiene, 6 parts acrylonitrile, and 2.5 parts itaconic acid (a carboxylation of 2.5% by weight of itaconic acid, based upon the total comonomer weight) with a particle size of 266 nm, and b) 10% by weight of MOWIOL™ 4-88, based upon the total weight of the solid latex polymer The mixture had a total solids content of 35% by weight, based upon the total weight of the mixture.

The redispersible polymer powder obtained by the spray drying had a volume average particle size between 10 to 20 μm. The spray dried powder was dispersed into deionized (DI) water at a 1% by weight solids level, and vortexed for 30 seconds twice. The redispersion was then measured using a Coulter LS 230 Laser Diffraction Particle Size Analyzer. Redispersibility data is shown in Table 1, below, which indicates that the redispersible polymer powder was readily dispersed to the original SB latex particle size distribution.

Preparation Example C

A redispersible polymer powder was produced as in Example A except that the water-insoluble film forming carboxylated styrene butadiene (SB) latex had a copolymerized comonomer content of 62 (weight) parts styrene, 35 parts butadiene, and 3 parts itaconic acid (a carboxylation of 3% by weight of itaconic acid), based upon the total comonomer weight with a particle size of 150 nm, and a $T_g$ of 8° C., and b) 10% by weight of MOWIOL™ 4-88 based upon the weight of the latex polymer. The mixture has a total solids content of 35% by weight, based upon the total weight of the mixture.

The redispersible polymer powder obtained by the spray drying had a volume average particle size between 10 to 20

µm. The spray dried powder was dispersed into deionized (DI) water at a 1% by weight solids level, and vortexed for 30 seconds twice. The redispersion was then measured using a Coulter LS 230 Laser Diffraction Particle Size Analyzer. Redispersibility data is shown in Table 1, below, which indicates that the redispersible polymer powder was readily dispersed to the original SB latex particle size distribution.

Preparation Example D

Example D redispersible polymer powder is DLP 2000, a commercial redispersible polymer powder produced by The Dow Chemical Company, Midland Mich. DLP 2000 comprises a vinylacetate/ethylene copolymer, which is medium hard with an ash content of 10-14% by weight, a density of 0.375 g/ml to 0.525 g/ml, and a moisture content of less than 2% by weight.

TABLE 1

Properties of RDPs Made of Styrene-Butadiene Latexes

| Examples | Latex polymer particle size (nm) | Carboxylation (wt %) | Redispersibility (%) |
|---|---|---|---|
| Example A | 249 | 1.75 | 90 |
| Example B | 266 | 2.5 | 95 |
| Example C | 150 | 3.0 | 100 |

Preparation of Cement Containing Tile Adhesives

The components and their relative amounts (% by weight or parts by weight, pbw) used to prepare cementmortar compositions using the redispersible powder compositions of Examples A, B, C and D are shown in Table 2, below. The cement mortar compositions were prepared by dry blending the solid components and then adding water indicated. Performance of the cement mortar compositions were tested and the results are shown in Table 3, below. Statistical analysis of the performance results are shown in Table 4, below.

The results in Table 3, below, indicate that formulations comprising the SB RDPs of the present invention exhibit a substantial improvement in 7 day water immersion shear strength and 28 day freeze/thaw shear strength when reducing cellulose ether dosages from 0.34% to 0.20% by weight. Further, the particle size and carboxylation level of the SB RDPs are important to the above performance.

As shown in Table 4, below, only Example 1 exhibits a statistically significant improvement in water immersion shear strength and freeze/thaw shear strength when reducing cellulose ether dosages from 0.34% to 0.20% by weight. For example, the 7 day water immersion shear strength increases to 356 psi with 0.20% by weight cellulose ether dosage as shown in Example 1 in Table 3, below. Thus, formulations comprising the low carboxylation, large particle size vinyl aromatic-diene copolymer containing RDPs of the present invention in combination with reduced cellulose ether dosages yield surprisingly good water immersion shear strength and freeze/thaw shear strength.

TABLE 2

Cement Mortar Formulations

| RAW MATERIAL | FORMULA (% BY WEIGHT) | | | | | | | |
|---|---|---|---|---|---|---|---|---|
| | Comp. 1 | Comp. 2 | Comp. 3 | Comp. 4 | Comp. 5 | Ex. 1 | Comp. 6 | Comp. 7 |
| Portland Cement Type I | 35 | 35 | 35 | 35 | 35 | 35 | 35 | 35 |
| Sand F-80, Silica Sand | 61.96 | 62.10 | 61.96 | 62.10 | 61.96 | 62.10 | 61.96 | 62.10 |
| Calcium Formate | 0.70 | 0.70 | 0.70 | 0.70 | 0.70 | 0.70 | 0.70 | 0.70 |
| RDP of Example D (DLP 2000) | 2.00 | 2.00 | — | — | — | — | — | — |
| RDP of Comparative Example B | — | — | 2.00 | 2.00 | — | — | — | — |
| RDP of Example A | — | — | — | — | 2.00 | 2.00 | — | — |
| RDP of Example C (DLP 402) | — | — | — | — | — | — | 2.00 | 2.00 |
| Hydroxyethyl methyl cellulose (HEMC) thickener | 0.34 | 0.20 | 0.34 | 0.20 | 0.34 | 0.20 | 0.34 | 0.20 |
| Total, % weight | 100 | 100 | 100 | 100 | 100 | 100 | 100 | 100 |
| Water:Powder Ratio by weight | 0.22 | 0.205 | 0.22 | 0.195 | 0.22 | 0.195 | 0.235 | 0.205 |

1. HEMC having a 40000 cps (Haake, 2.55 reciprocal seconds) in a 2 wt % solution in water at room temperature.

TABLE 3

Properties of Cement Mortar Formulation

| CEMENT TILE ADHESIVE END-USE PROPERTIES | FORMULA | | | | | | | |
|---|---|---|---|---|---|---|---|---|
| | Comp. 1 | Comp. 2 | Comp 3 | Comp 4 | Comp. 5 | Ex. 1 | Comp. 6 | Comp. 7 |
| Density (g/ml) | 1.67 | 1.72 | 1.64 | 1.67 | 1.65 | 1.67 | 1.58 | 1.60 |
| Brookfield mortar viscosity 5 RPM (cps) | 475000 | 375500 | 493750 | 460000 | 486250 | 465000 | 457500 | 466250 |

TABLE 3-continued

Properties of Cement Mortar Formulation

| CEMENT TILE ADHESIVE END-USE PROPERTIES | FORMULA | | | | | | | |
|---|---|---|---|---|---|---|---|---|
| | Comp. 1 | Comp. 2 | Comp 3 | Comp 4 | Comp. 5 | Ex. 1 | Comp. 6 | Comp. 7 |
| Shear Strength, Impervious Ceramic Mosaic Tile: | | | | | | | | |
| 7 day (MPa), Average | 2.72 | 3.06 | 2.26 | 2.36 | 2.23 | 2.52 | 1.88 | 2.15 |
| 7 day (MPa), Standard Deviation | 0.25 | 0.08 | 0.10 | 0.20 | 0.14 | 0.46 | 0.11 | 0.1319 |
| 7 day water immersion (MPa), Average | 1.54 | 1.60 | 1.40 | 1.62 | 1.61 | 2.45 | 1.50 | 1.93280 |
| 7 day water immersion (MPa), Standard Deviation | 0.20 | 0.29 | 0.28 | 0.47 | 0.18 | 0.19 | 0.17 | 0.41 |
| 28 day (MPa), Average | 2.41 | 2.71 | 2.36 | 2.50 | 2.31 | 2.38 | 1.82 | 2.05 |
| 28 day (MPa), Standard Deviation | 0.28 | 0.37 | 0.21 | 0.33 | 0.23 | 0.25 | 0.13 | 0.24 |
| Freeze Thaw (MPa), Average | 1.28 | 1.57 | 1.23 | 1.75 | 1.37 | 1.94 | 1.47 | 1.89 |
| Freeze Thaw (MPa), Standard Deviation | 0.18 | 0.38 | 0.19 | 0.28 | 0.18 | 0.33 | 0.10 | 0.23 |
| Shear Strength, Plywood: | | | | | | | | |
| 7 day (MPa), Average | 0.98 | 0.85 | 0.94 | 1.01 | 0.83 | 0.82 | 0.68 | 0.63 |
| 7 day (MPa), Standard Deviation | 0.12 | 0.14 | 0.13 | 0.03 | 0.13 | 0.25 | 0.12 | 0.07 |
| 28 day (MPa), Average | 0.94 | 0.89 | 0.98 | 0.93 | 0.94 | 0.89 | 0.67 | 0.65 |
| 28 day (MPa), Standard Deviation | 0.17 | 0.15 | 0.21 | 0.16 | 0.23 | 0.16 | 0.20 | 0.19 |
| Compressive Strength | | | | | | | | |
| (MPa), Average | 16.16 | 17.47 | 14.36 | 17.74 | 14.84 | 17.14 | 12.46 | 13.98 |
| (MPa), Standard Deviation | 1.19 | 0.74 | 0.95 | 0.76 | 0.70 | 1.25 | 0.90 | 0.82 |

TABLE 4

Statistical Analysis of Cement Mortar Formulation Test Results

| Cement Tile Adhesive End-Use Properties | Same or Better Performance When Reducing Cellulose Ether from 0.34% to 0.20% | RDP sample which exhibited the statistically significant property difference |
|---|---|---|
| Shear Strength, Impervious Ceramic Mosaic Tile: | | |
| 7 day water immersion | Yes | Example 1 |
| Freeze Thaw | Yes | Example 1 |
| 7 day | Yes | — |
| 28 day | Yes | — |
| Shear Strength, Plywood: | | |
| 7 day | Yes | — |
| 28 day | Yes | — |

We claim:

1. A cement containing dry mix composition comprising
a) hydraulic cement;
b) a water-redispersible polymer powder (RDP) comprising a water-insoluble film-forming vinyl aromatic-diene polymer and a colloidal stabilizer, said water-insoluble film-forming polymer having an average particle size of from 200 nm to 500 nm and an amount of carboxylation of from 0.1% by weight to 2.25% by weight of at least one ethylenically unsaturated dicarboxylic acid, salts thereof, or mixtures thereof, based on the amount of copolymerized carboxyl group containing monomer based on the total weight of monomers used to make the polymer; and,
c) from 0.17 to 0.35 wt. %, based on the total weight of the dry mix composition of the present invention, of a cellulose ether,
whereby when the dry mix is mixed with water to form a mortar or adhesive having a mortar viscosity within the range of 400,000 to 600,000 cps mortar at 5 rpm, the amount of cellulose ether used is reduced by at least 15% as compared to the amount of cellulose ether used to achieve the same mortar viscosity when using the same cement comprising the same cellulose ether and the same amount of the same RDP made from the same polymer as the vinyl aromatic-diene latex polymer and having the same average particle size, with the exception that the latex polymer in the comparative composition has a degree of carboxylation of 2.5 wt. %.

2. The cement composition of claim 1, wherein the water-insoluble film-forming polymer has an amount of carboxylation of from 0.5% by weight to 2.125 wt. % and an average particle size of from 220 nm to 400 nm.

3. The cement composition of claim 2, wherein the average particle size of the polymer is 240 nm or more.

4. The cement composition of claim 1, wherein the water-redispersible powder is a carboxyl group containing styrene butadiene copolymer.

5. The cement composition of claim 1 wherein the ethylenically unsaturated dicarboxylic acid is selected from the group consisting of itaconic acid, maleic acid, fumaric acid and mixtures thereof.

6. A method of sealing, bonding or coating a substrate comprising:
providing a dry mix cement composition comprising: hydraulic cement, a water redispersible vinyl aromatic-diene polymer powder (RDP) comprising a water-insoluble film-forming polymer and a colloidal stabilizer, and an amount of a cellulose ether, said film-forming polymer having an average particle size of from 200 nm to 500 nm and an amount of carboxylation of from 0.1% by weight to lower than 2.25% wt. % of at least one ethylenically unsaturated dicarboxylic acid, salts thereof, or mixture thereof, based on the amount of copolymerized carboxyl group containing monomer based on the total weight of monomers used to make the polymer, wherein the amount of the cellulose ether is reduced by at least 15% as compared to the amount of cellulose ether used to achieve a mortar viscosity within the range of 400,000 to 600,000 cps mortar at 5 rpm when using the same cement comprising the same cellulose ether, and the same amount of the same RDP made from the same polymer as the vinyl aromatic-diene latex polymer and having the same average particle size, with the exception that the latex polymer in the comparative composition has a degree of carboxylation of 2.5 wt. %;

(1) mixing the dry mix hydraulic cement composition with water to make a mortar having a desired mortar viscosity of from 400,000 to 600,000 cps mortar at 5 rpm, (2) applying the mortar to a substrate;

(3) applying a tile thereto; and, (4) drying.

7. The method of claim 6 wherein the water-insoluble film-forming polymer has an amount of carboxylation of from 0.5 to 2.125 wt. %, based on the amount of copolymerized carboxyl group containing monomer based on the total weight of monomers used to make the polymer.

8. The method of claim 6 wherein the water-insoluble film-forming polymer has an average particle size of from 220 nm to 400 nm.

9. The method of claim 6 wherein the water-insoluble film-forming polymer is a copolymer comprising, in copolymerized form, the monomers styrene, butadiene, itaconic acid and acrylonitrile.

10. The method of claim 6, wherein the substrate comprises plywood, backerboard, concrete, oriented strandboard or a finished or unfinished interior wall surface.

* * * * *